Figure 2:
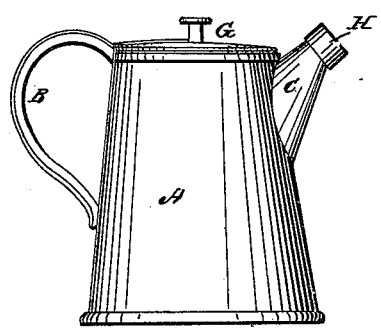

T. BISHOP.

Coffee Pot.

No. 25,994.

Patented Nov. 1, 1859.

Witnesses:
George A Moody
Geo. E. Ferr

Inventor:
Thomas Bishop.

UNITED STATES PATENT OFFICE.

THOMAS BISHOP, OF PLAINVILLE, CONNECTICUT, ASSIGNOR TO HIMSELF AND JAMES H. BISHOP, OF SAME PLACE.

TEA AND COFFEE POT.

Specification of Letters Patent No. 25,994, dated November 1, 1859.

*To all whom it may concern:*

Be it known that I, THOMAS BISHOP, of Plainville, county of Hartford, and State of Connecticut, have invented certain new and useful Improvements in Tea and Coffee Pots; and I do hereby declare that the same is described and represented in the following specification and drawings, and to enable others skilled in the art to make and use my improvement I will proceed to describe its construction, referring to the drawings, in which the same letters indicate like parts in each of the figures.

The nature of this improvement consists in constructing an area around the upper and inside portion of the pot, and providing, or forming upon the lid of the pot, one or more projecting rims extending downward therefrom nearly to the bottom of said area, and also providing a tube or nozzle, or a portion thereof conducting from the area into the nozzle proper, which nozzle has a cap fitted closely thereto, all being so constructed that when the tea or coffee is put to steeping or boiling in the usual way (having supplied the area with water) the fragrance and full substance is retained within the body of the pot until desired for use.

Figure 1:
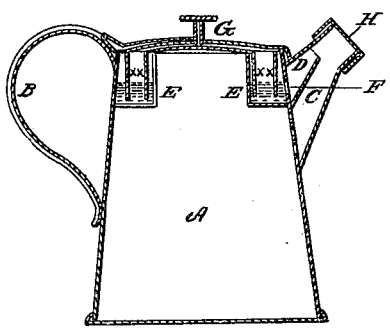

In the accompanying drawings Figure 1 is a sectional view. Fig. 2 is a side elevation.

A is the body of the pot.

B is the handle.

C is the nozzle proper.

D is a tube or nozzle, or a portion thereof secured partly to the body of the pot, and partly to the upper portion of the nozzle C, its upper end being a little lower than the top of the pot, and having communicating orifices from the area at F thereto.

E is an area secured to the top or upper portion inside of the pot, the object of which is to hold water (and it is believed that cold water will best accomplish the desired object) and prevent boiling over and make it tight.

G is the lid, to the inside of which is secured flanges or rings X, which project downward nearly or quite to the bottom of the area (one, however, may answer the desired purpose equally well,) the object of which is to keep it (the pot) steam tight and prevent any escape of the substance or fragrance of the tea or coffee.

H is a cap which is designed to be fitted closely to the end of the nozzle, and it is thought it may be desirable sometimes to fit the cap onto the nozzle with a screw to prevent its being thrown off by the pressure of the steam.

Now by putting the tea, coffee, &c., into the pot in the usual way and pouring onto it the required amount of boiling water, then filling or partly filling the area with water and closing the lid G and securing the cap H, and placing the pot so as to receive the required heat, to boil, in the usual way, the water in the area above being of a different temperature will keep the pot steam tight and prevent the escape of the aroma.

It will be clearly seen that in this mode of constructing pots for tea coffee &c. that the use of siphon tubes and additional cups with, or without strainers &c. (which are so complicated and liable to get out of order) are or may be removed and by this plain simple arrangement, requiring very little if any more care or attention than the ordinary pots. Thus I am enabled to produce a new and useful article of manufacture use and trade thereby attaining the much and long desired object viz: securing and retaining the full substance within the pot until such time as may be desirable to pour it off.

What I claim and desire to secure by Letters Patent is—

The arrangement of the area E flanges X upon the lid G, with apertures F and D in the manner as and for the purpose described.

THOMAS BISHOP.

Witnesses:
  GEORGE A. MOODY,
  GEO. E. TERRY.